United States Patent [19]
Crill

[11] Patent Number: 5,993,039
[45] Date of Patent: Nov. 30, 1999

[54] POWER-LOSS INTERLOCKING INTERFACE METHOD AND APPARATUS

[75] Inventor: Rikk Crill, Longmont, Colo.

[73] Assignee: Avalon Imagining, Inc., Boulder, Colo.

[21] Appl. No.: 08/824,671

[22] Filed: Mar. 26, 1997

[51] Int. Cl.⁶ ........................................ G05B 9/02
[52] U.S. Cl. .................................. 364/184; 364/528.27
[58] Field of Search ........................ 364/184, 140.04, 364/185, 186, 187, 528.27

[56] References Cited

U.S. PATENT DOCUMENTS 5,422,808  6/1995  Catanese, Jr. et al. ................. 364/184

*Primary Examiner*—William Grant
*Assistant Examiner*—Chad Rapp
*Attorney, Agent, or Firm*—Chrisman Bynum & Johnson; James R. Young

[57] ABSTRACT

A latching interface is provided between a machine and a monitoring or control system for the machine to latch the machine in a mode that is safe for the machine and for operating personnel upon power loss. The interface includes one or more latching relay switches, connected into one or more input signal circuits, that may be selectively set and reset by an interface microprocessor to actuate or deactuate the machine from performing certain functions. The interface microprocessor is programmable to set or reset the latching relay switches in response to a signal from a power loss sensor indicating that power to a monitor/controller device, that monitors and controls the functions of the machine, has been interrupted. The interface system further includes a power feed circuit to provide a back-up power supply to power the interface microprocessor during setting and resetting of the latching relay switches to the safe mode upon loss of normal power. Alternately, a solid state switch in series with an additional latching relay switch is connected into the input signal circuit in parallel with one or more of the latching relay switches. During normal operations, the interface microprocessor may operate these solid state switches in response to signals from the monitor/controller to control normal operating modes or functions of the machine. Upon power loss, the interface microprocessor opens the latching relay switch in series with each solid state switch and operates the parallel latching relay switch to place and keep the machine in a safe operating mode.

9 Claims, 2 Drawing Sheets

POWER-LOSS INTERLOCKING INTERFACE METHOD AND APPARATUS

BACKGROUND OF THE INVENTION

1. Field of the Invention

The present invention relates generally to electrical controls for machinery and processes and more specifically to a method and apparatus for locking electrical control states automatically upon loss of electric power.

2. State of the Prior Art

Many machines and industrial equipment have functions that are monitored or controlled by electronic controls comprising microprocessors that monitor signals, physical conditions, or time and, in response to the presence or absence of such signals, physical conditions, or time, generate control signals to actuate or deactuate functions of the machines or industrial equipment according to some program, logic, or algorithm. The machines or industrial equipment respond to the presence or absence of such control signals to either initiate and perform some functions or to stop performance of some functions. For example, many conventional plastic injection molding machines have mechanisms that, upon sensing an electrical signal, start and continue through a cycle of closing a mold, filling the mold with liquid or molten plastic, cooling the mold to allow the plastic to harden into a hard plastic part, open the mold, and eject the hard plastic part out of the mold. A monitoring system senses whether the hard plastic part has been successfully and completely ejected from the mold before the injection molding machine is allowed to close the mold again and to proceed with the cycle to make another plastic part, because mistakenly closing the mold on a partially ejected hard plastic part that has not been cleared from the mold can cause severe and costly damage to the mold.

Loss of electrical power in such monitoring systems can leave control signals for such machines or equipment in undesirable and perhaps even unsafe states. For example, in the plastic injection molding machines described above, a power loss in the monitoring system could leave an output signal in a state that allows the injection molding machine to close the mold, even if a hard plastic part has not been successfully ejected and cleared from the mold, which, as mentioned above, can cause severe and costly damage to the mold.

There are many kinds of equipment and control schemes available to provide myriad degrees of protection against undesired consequences in electric power loss situations for various applications. For example, some equipment incorporates a power down cycle in which the equipment senses a power-off request signal from a switch actuated by an operator and, in response, takes the time to run through a series of steps to put itself in a safe state before actually turning off the power via an electronic device. However, if electric power is disconnected or lost to such equipment unexpectedly, such as a power line failure, its outputs may be left in undefined states that might be dangerous to related equipment or to operators.

In another approach, plug-in output modules have been used with equipment, which modules can be selected to have a desired combination of normally-opened and/or normally-closed states in the absence of power to provide safe conditions in the equipment. This approach, however, lacks flexibility. If the equipment is used in a different application where such combination of normally-opened and/or normally-closed states yields unsafe or undesired conditions, the equipment would have to be re-wired with a new set of modules.

Still another approach used in some monitoring or control devices has been to use a power-fail output from the monitoring or control devices to "warn" companion equipment that are being monitored or controlled that the monitoring or control devices are not functional. Then, it is left to the equipment that was being monitored or controlled to fend for itself, whether it be to continue functioning automatically or to shut-down in response to such "warning."

Yet other equipment have been designed and built to be inherently fail-safe regardless of the outputs from associated monitoring or control devices. However, such equipment that is specially designed to deal with unexpected or improper outputs from associated monitoring or control devices are probably more expensive than would be needed if another solution was available for power loss situations.

SUMMARY OF THE INVENTION

Accordingly, an object of this invention is to provide an improved apparatus and method for interfacing monitoring or control systems with equipment being monitored or controlled to provide desired safe states for such equipment upon unexpected power-loss.

A more specific object of this invention is to provide monitoring or control systems with an improved apparatus and method for setting desired output states upon power-loss to such monitoring or control apparatus that puts equipment being monitored or controlled into safe, non-functional idle.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims. To achieve the foregoing and other objects and in accordance with the purposes of the present invention, as embodied and broadly described herein, the apparatus of this invention may comprise one or more latching relay switches connected into one or more input signal circuits that actuate or deactuate a machine from performing certain functions, depending on whether the input signal circuits are opened or closed, an interface microprocessor programmed and connected to the latching relay switches for setting or resetting them as required to deactuate the machine from performing those functions in response to a signal that indicates power to a monitor/controller that controls the machine functions based on certain conditions has been interrupted or fails. A secondary or back-up power supply is provided to power the interface microprocessor through these operations for setting or resetting the latching relay switches as described above.

In an alternate embodiment, a solid state switch in series with another latching relay switch are connected into the input signal circuit in parallel with the previously discussed latching relay switch. In this alternate embodiment, the interface microprocessor opens and closes the solid state switch in response to control signals from the monitor/controller to control functions of the machine when power is normal. However, if power to the monitor/controller fails, the interface microprocessor opens the latching relay switch that is in series with the solid state switch to disable the ability of the solid state switch to actuate any machine functions, and the interface microprocessor either opens or closes the first latching relay switch as required to keep the machine in a desired deactuated or idle state.

To further achieve the foregoing and other objects and in accordance with the purposes of the present invention, as embodied and broadly described herein, the method of this invention may comprise the steps of interfacing a controller and a machine or apparatus that is being controlled by the controller with one or more latching relay switches, monitoring the power source to the controller, and, upon detection of an interruption or failure of the power source to the controller, setting the latching relay switch to prevent any actuation of the machine or apparatus. The method can also include using an interface microprocessor to set the latching relay switch in response to a power-fail signal, and powering the interface microprocessor with a back-up power supply after such interruption or failure of the power source and while the interface microprocessor is setting the latching relay switch. An alternate method includes implementing actuation and deactuation of the machine or apparatus during normal operations with the controller powered by inserting and opening and closing a solid state switch in the input signal circuit, but also inserting a second latching relay in series with the solid state switch and opening the second latching relay when interruption or failure of the power source to the controller is detected in order to prevent the solid state switch from actuating the machine or apparatus. The interlock feature of this method and apparatus can also respond to a safety lock-out signal, such as may be generated when an operator or repair person opens a shroud or access door to an injection molding apparatus, to set the latching relay switch to prevent operation of the injection molding machine as the long as the safety lock-out signal is detected.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings.

DETAILED DESCRIPTION OF THE PREFERRED EMBODIMENTS

Figure 1:
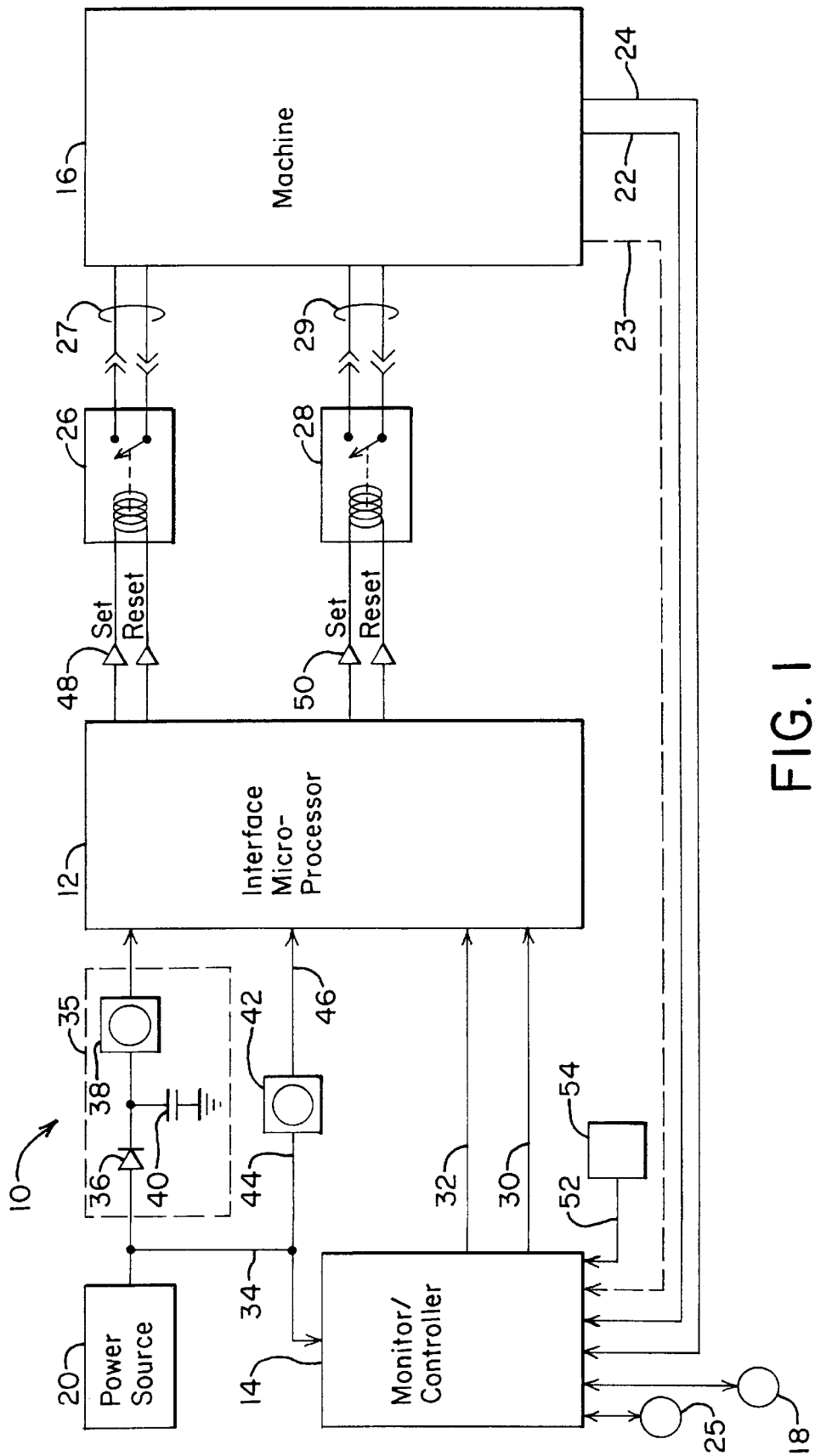
FIG. 1 is a function block diagram of an interface system for interfacing a monitor or controller with a machine according to this invention.

An interface system 10 for interfacing a monitoring system or controller 14 with a machine 16 that is being monitored or controlled by the monitoring system or controller 14 according to this invention is illustrated diagrammatically in FIG. 1. In normal operations, the machine 16 is designed and set up to perform certain functions and/or not perform certain other functions in response to, or in the absence of, certain conditions monitored by the monitor or controller 14 or that may be programmed in the monitor or controller 14. Such monitored conditions may be acquired by the monitor/controller 14 from external sources, as indicated at 18 or they may be acquired from conditions in the machine 16, as indicated by machine outputs 22, 24. If the primary power source 20 to the monitor/controller 14 is interrupted or fails for any reason, the interface microprocessor 12 sets or resets latching relay switches 26, 28 to whatever output signal states that arc required to put or maintain the machine 16 in a safe or desired idle or in some other safe or desired function.

For example, but not for limitation, if the machine 16 is an injection molding machine that closes a mold in response to a signal from the monitor/controller 14 and continues to perform the functions of filling the mold with liquid or molten plastic, cooling the mold to allow the plastic to harden into a hard plastic part, and then opening the mold to eject the hard plastic part, then upon interruption or failure of electric power to the monitor/controller 14, the latching relays 26, 28 prevent the mold from closing and the ejectors from firing. According to an invention described in a U.S. patent application Ser. No. 08/824,670 by joint inventors Edward F. Kachnic, James A. Walker, and Rikk Crill, entitled Skip-Eject System for Injection Molding Machines, which is being filed concurrently herewith, and which is incorporated herein by reference, a signal 22 may be output by the machine 16 to indicate that the mold is open. In response to signal 22, the monitor/controller 14 acquires input from a part detector as indicated at 18 and determines if the hard plastic part has been formed in the mold. Some more sophisticated part detectors 18, such as electronic image acquisition and monitoring systems, can also determine whether the part has been molded completely. If a part is detected in the mold, the monitor/controller 14, in response to such a signal from part detector 18, outputs a signal 30 to fire the ejectors, which action is then implemented by the interface microprocessor 12 actuating the latching relay 28 in whatever manner (open or closed) is required to make the circuit 29 fire the ejectors (not shown). When the ejectors have fired and returned to their non-use or idle positions, the machine 16 may be configured to output a signal indicated at 24, which prompts the monitor/controller 14 to actuate the part indicator 18 again to determine whether the hard plastic part has been ejected. If not, the monitor/controller 14 may output another signal 30 to fire the ejectors again, which signal is transmitted to the machine at 16 via the normally-closed latching relay 28. However, if the input from the part detector indicated at 18 results in a determination by the monitor/controller 14 that the hard plastic part has been ejected out of the mold, then the monitor/controller 14 outputs a signal 32 to close the mold and continue with a new part molding cycle, which signal is transmitted via the latching relay 26 to the machine 16. In some injection molding machines, there is no signal output 24 to indicate the ejectors have returned to a non-use or idle position, in which case a signal from a timer circuit 25, which may be part of the monitor/controller 14, can be used instead to initiate another check by the part detector 18. For example, the timer circuit 25 could be initialized in response to the fire ejector signal 30 and then at some time interval that is predetermined to be sufficient for the ejectors to cycle, once, twice, or as many times as desired, the timer circuit 25 could output the signal to cause the monitor/controller 14 to actuate the part detector 18 again. In another variation, the ejectors may continue cycling until the signal from the timer circuit 25 causes the monitor/controller 14 to output a signal that causes the interface microprocessor 12 to actuate latching relay 28 to stop the ejector cycling. In some injection molding machines, a fail-safe or safety signal 23 may be generated when an operator or repair person opens a shield or access door on the machine. Such a safety signal 23 may be used by the monitor/controller 14 to output signals 30, 32 to cause the interface microprocessor 12 to set both latching relays 26, 28 in modes that prevent both mold closing and ejector cycling in the machine 16.

In normal operations, the interface micro-processor 12 receives the output signals 30, 32 from the monitor/controller 14 and, in response, sets or resets the respective latching relays 26, 28 as required to cause the machine 16 to perform the desired functions or to prevent undesired functions as programmed in the monitor/controller 14. However, when the power source 20 to the monitor/controller 14 is interrupted or fails, the interface microprocessor 12 resets the latching relays 26, 28 to states that put and maintain the machine 16 in a safe idle condition or in whatever other condition that is desirable or safe. In the illustration of FIG. 1, the machine 16 has two exemplary input signal circuits 27, 29 that actuate or deactuate certain functions performed by the machine 16, depending on whether these input signal circuits 27, 29 are opened or closed. The first latching relay switch 26 and the second latching relay switch 28 are advantageously connected in these respective input signal circuits 27, 29 to open or close them upon command by the interface microprocessor 12.

In the example where the machine 16 is an injection molding machine, as described above, if the power source 20 to the monitor/controller 14 is interrupted, the interface microprocessor 12 may be programmed to reset the latching relay 26 to whatever state keeps the injection molding machine from closing the mold and to reset the latching relay 28 to whatever state keeps the ejector in the injection molding machine from firing. For example, if the latching relay 26 has to be closed to actuate the injection molding machine to close the mold and continue in a plastic part molding cycle, then, upon interruption or failure of the power source 20 to the monitor/controller 14, the interface microprocessor 12 will reset the latching relay 26 to an open state. Once reset, the latching relay 26 will remain latched in that open state, even without power, until another set signal from the interface microprocessor 12 changes its state to closed. On the other hand, if the injection molding machine is set up to close the mold when the latching relay 26 is open, then the interface microprocessor 12 can be programmed to reset the latching relay 26 to close and remain closed when the power source 20 is interrupted or fails. Likewise, if the ejector in the injection molding machine fires when the latching relay 28 is closed, then upon interrupt or failure of the power source 20, the interface microprocessor 12 can be programmed to set the latching relay 28 to an open state. On the other hand, if the ejector in the injection molding machine fires when the latching relay 28 is open, then, upon interrupt or failure of power source 20, the interface microprocessor 12 can be programmed to set the latching relay 28 to a closed state. The interface microprocessor 12 can be programmed via software and reprogrammed as desired to achieve any combination of these power loss settings or resettings for latching relays 26, 28, and they can even be changed on-the-fly as the machine 16 states or functions change. Also, the illustration in FIG. 1 shows only two latching relays 26, 28 for convenience, but any number of such buffer and latching relay sets can be operated by the interface microprocessor 12 as needed for any particular machine 16 or other application.

In normal operation when the power source 20 is functioning properly and is not interrupted or failed, it powers the monitor/controller 14, via a primary power circuit as indicated by connection 34. The power source 20 supplies power to the interface microprocessor 12 via a power feed circuit 35. At the same time, the power source 20 charges a capacitor 40 connected to the power feed circuit 35. When the power source 20 is interrupted or fails, the diode 36 in feed circuit 35 prevents the charged capacitor 40 from feeding back toward the power source 20, while a voltage regulator 38 in power feed circuit 35 feeds power stored in the capacitor 40 at a regulated voltage into the interface microprocessor 12. Also, a power loss sensor 42, which is connected via circuit 44 to the power source 20 in common with the primary power circuit 34 that supplies the monitor/controller 14, senses when power from the power source 20 is present or absent. When the power source 20 is interrupted or failed, the power-loss sensor 42 outputs a power-fail signal 46 to the interface microprocessor 12, which is responsive to such a signal 46 to reset the latching relays 26, 28 through the respective buffers 48, 50 to the power-down states as discussed above to put the machine 16 in an idle or other desired mode. The power-fail signal 46 output from power-loss sensor 42 can be, for example, "high" as long as the power source 20 is operating normally and "low" when the power-loss sensor 42 detects an interrupt of failure of power source 20, although it can also be vice versa as will be understood by persons skilled in the art. With the latching relays 26, 28 reset as described above and the machine 16 in a safe idle or other desired mode, the interface microprocessor 12 then waits in a timeout mode until the capacitor 40 has been discharged. However, as discussed above, even when the capacitor 40 has been discharged and the interface microprocessor 12 is no longer powered, the latching relays 26, 28 will remain latched in the last ordered states.

When normal operation of the power source 20 is restored, the monitor/controller 14 can output a signal 32 or 30 automatically to interface microprocessor 12 to renew the machine 16 operations as before the power interrupt or failure occurred, if the monitor/controller 14 is programmed to do so. However, it may be preferable to program monitor/controller 14 to leave everything in the safe idle or other desired mode until an operator actuates a restart signal 52 from any appropriate user interface 54, such as a keyboard, touch-screen control, or even a simple start button, as will be understood by persons skilled in the art.

Myriad choices are available for the operative components needed to implement this invention, as will also be understood by persons skilled in the art, but some suitable examples may include: a MC68HC11 manufactured by Motorola of Phoenix, Ariz. for the interface microprocessor 12; a Pentium CPU manufactured by Intel Corporation of USA for the monitor/controller 14; MIC 5801 chips manufactured by Micrel, of San Jose, Calif. for the buffers 48, 50; G68K-114P-U5-DC5 manufactured by Omron of Ontario, Canada for the latching relays 26, 28; a Schottky diode IN5819 manufactured by Motorola of Phoenix, Ariz., for the diode 36; a ECE-A1HU221 manufactured by Panasonic of USA, for the capacitor 40; a LM340 manufactured by National Semiconductor of San Jose. Calif., for the voltage regulator 38: and a MC340640 manufactured by Motorola of Phoenix, Ariz., for the power-loss detector 42. Persons skilled in the art can easily design actual circuits to interconnect and implement these components to accomplish the functions of this invention once the invention is understood from the description above.

As will also be understood by persons skilled in the art, myriad substitutions of equivalent components can be used to perform the same functions as the components described above. For example, a battery could be used in place of capacitor 40, which could provide more power capacity, hence time for circuit operation, if needed. Of course, larger capacitors 40 could also provide some increased power capacity. Instead of the diode 36, capacitor 40, and voltage regulator 38 combination, an AC-DC converter or a DC—DC converter could be used, which would allow operation from a single voltage main supply, rather than needing a main power source 20 with a higher voltage than the regulated power circuit as may be required by the implementation in FIG. 1. Of course, a circuit other than the interface microprocessor 12 could be used to set and reset the latching relays 26, 28 including, but not limited to the monitor/controller 14 itself. Finally, if a particular application or implementation of this invention requires multiple voltages, additional voltage regulators could be provided from the capacitor in power input circuit 35.

Figure 2:
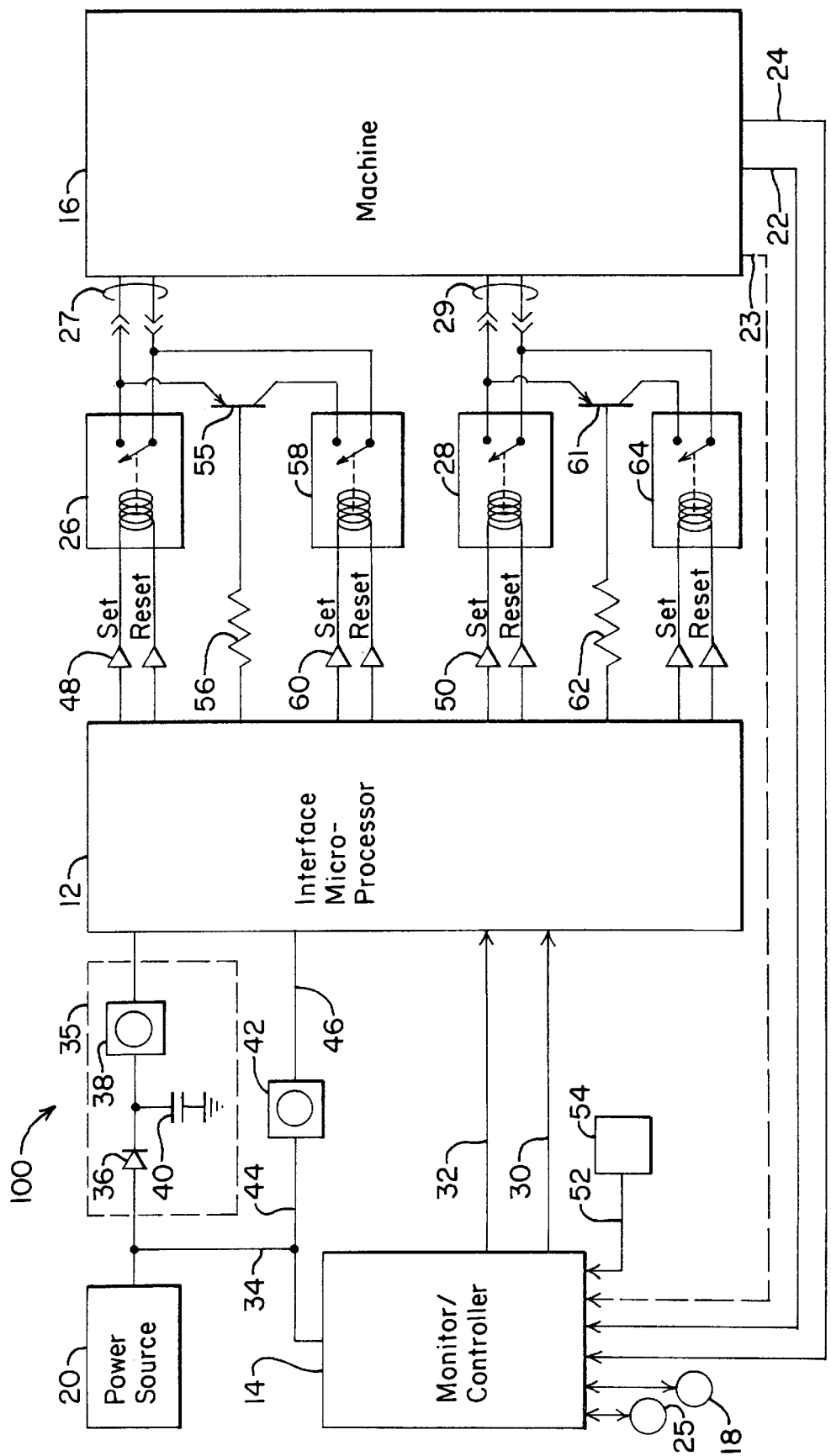
FIG. 2 is a function block diagram of an alternate embodiment interface system for interfacing a monitor or controller with a machine according to this invention.

In some applications, latching relays 26, 28 may not be suitable for normal machine 16 operations where highly repetitive, clean, bounce-free output signals from the latching relays 26, 28 are needed for input to the machine 16. The alternate embodiment 100 of the interface system of this invention, as illustrated diagrammatically in FIG. 2, can be used advantageously in such situations. All of the power-loss detector 42 and supplemental power circuit 35 components 36, 38, 40 as well as the interface microprocessor 12 of this alternate embodiment interface system 100 can be the same as described above for the first embodiment interface system 10 or by any suitable substitutes for such components. In this alternate embodiment interface system 100, however, solid state transistor 54 and base resistor 56 devices can be added along with another latching relay 58 to function in combination with the latching relay 26 to provide clean, bounce-free (i.e., solid-state) output signals to the machine 16. Essentially, in normal powered operations of this interface system embodiment 100, the interface microprocessor 12 is programmed to put latching relay 26 in an open state and to put the additional latching relay 58 via buffers 60 into a closed state, so that the operational output to the machine 16 can be switched on and off by the transistor 54. Therefore, the interface microprocessor 12 can provide the normal routine controls to the machine 16 by outputting "high" and "low" signals through resistor 56 to switch the transistor on and off. However, when the normal power source 20 is interrupted or fails, the interface microprocessor 12 operates on regulated power from the capacitor 40, as described above, long enough to set latching relay 58 to an open state, thus effectively disabling transistor 54 portion of the control circuit, and simultaneously sets latching relay 26 to whatever state—open or closed—that puts and maintains the machine 16 in the safe idle or other desired power-loss mode, as described above for the first embodiment 10. Upon restart, as, for example, in response to an operator input signal 52 to monitor/controller 14 from a user interface 54, the interface microprocessor 12 resets latching relay 26 to an open state and latching relay 58 to a closed state to re-enable the solid-state output switching function of transistor 55.

Of course, these additional output control components are duplicated with another transistor 61, resister 62, and additional latching relay 64 for use in conjunction with latching relay 28 to provide clean, bounce-free (i.e., solid state) normal operation control signals on the second output to machine 16. As many additional sets of latching relays, transistors, and resistors (not shown) as there may be control circuits needed for operation of machine 16 can be provided and controlled in the same manner by interface microprocessor 12.

The foregoing description is considered as illustrative only of the principles of the invention. Furthermore, since a number of modifications and changes will readily occur to those skilled in the art, it is not desired to limit the invention to the exact construction and process shown described above. Accordingly, all suitable modifications and equivalents may be resorted to falling within the scope of the invention as defined by the claims which follow.

I claim:

1. For a machine that is powered by a primary power source and that requires repetitious input signals from a monitor/controller system that is also powered by the primary power source via a primary power circuit to continue performing functions for which the machine is designed, and in which the machine has an input signal circuit that requires on and off switching of electricity in the input signal circuit to actuate the machine to perform certain functions or to deactuate the machine from performing said functions, an interface system comprising:

a latching relay switch positioned in said input signal circuit, which latching relay switch has the capability to close the input signal circuit of the machine in response to a close signal and the capability to open the input signal circuit of the machine in response to an open signal;

an interface microprocessor that is programmed to generate whichever close signal or open signal that is required to set the latching relay switch in a state that, in response to a power-fail signal, deactuates and prevents the machine from performing said functions regardless of whether the machine is or is not powered by said primary power source;

a power-fail detector connected to the primary power circuit, which power-fail detector has a capability to detect when electric power from the primary power source is interrupted or fails and in response to generate the power-fail signal;

an isolated power supply connected to the interface microprocessor, but not to the machine, said isolated power supply having sufficient back-up electric power to enable the interface microprocessor, in response to said power-fail signal, to generate the close signal or the open signal that sets or resets the latching relay switch in a state that deactuates and prevents the machine from performing said functions.

2. The interface system of claim 1, wherein said isolated primary power supply includes a capacitor connected to the primary power source, a diode between the capacitor and the primary power source that is oriented to prevent electric power from the capacitor from back-flowing to the primary power source, and a voltage regulator connected between the capacitor and the interface microprocessor.

3. The interface system of claim 1, wherein said interface microprocessor, in the absence of the power-fail signal, is also responsive to the actuation and the deactuation input signals generated by the monitor/controller to generate close signals and open signals.

4. The interface system of claim 1, wherein said latching relay switch is a first latching relay switch, and wherein said interface system includes a solid state switch and a second latching relay switch connected to each other in series and connected together in the input signal circuit in parallel to said first latching relay switch, said interface microprocessor being connected to the solid state switch in a manner that enables the interface microprocessor to open and close the solid state switch, and said interface microprocessor also being connected to said second latching relay switch in a manner that enables the interface microprocessor to set the second latching relay switch to an open state or in a closed state.

5. The interface system of claim 4, wherein said interface microprocessor is also responsive to the power-fail signal to set the second latching relay in the open state to disable switching of the input signal circuit on and off by the solid state switch.

6. The interface system of claim 4, wherein said interface microprocessor, in the absence of the power-fail signal, is also responsive to the actuation and the deactuation input signals generated by the monitor/control to generate the open signal to set the first latching relay switch in an open state, to generate a signal to set the second lathing relay switch in a closed state, and to generate signals to open and close the solid state switch to actuate the machine to perform said functions and to deactuate the machine from performing said functions.

7. A method of controlling a machine that is powered by a primary power source and has an input signal circuit which actuates the machine to perform a function or that deactuates the machine from performing the function, depending on whether the input signal circuit is opened or closed, comprising the steps of:

connecting a first latching relay switch into said input signal circuit of the machine such that said first latching relay switch in a closed state closes said input signal circuit of the machine and that said first latching relay switch in an open state opens said input signal circuit of the machine;

connecting an interface microprocessor to said first latching relay switch in such a manner that said interface microprocessor is responsive to an actuate signal from a controller that is also powered by the primary power source to assert whichever open state or closed state of the first latching relay switch results in such actuation and is also responsive to a power-fail signal to assert whichever open state or closed state of the first latching relay switch results in deactuating and preventing the machine from performing said function regardless of whether the machine is or is not powered by said primary power source; and monitoring the primary power source in a manner that detects any interruption or failure of the primary power source to the controller and generating the power-fail signal in response to detection of such an interruption or failure of the primary power source to the controller.

8. The method of claim 7, including the steps of powering said interface microprocessor with said primary power source and simultaneously charging a back-up power supply with said primary power source, and, upon interruption or failure of said primary power source, powering said interface microprocessor, but not said machine, with said back-up power source while said interface microprocessor, in response to said power-fail signal, asserts whichever open state or closed state of the first latching relay switch results in deactuating and preventing the machine from performing said function.

9. The method of claim 7, including the steps of connecting a solid state switch in series with a second latching relay switch, connecting said solid state switch and said second latching relay switch into said input signal circuit, connecting the interface microprocessor to the solid state switch in such a manner that the interface microprocessor closes and opens the solid state switch in response to actuation and deactuation signals generated by the controller when the controller is powered by the primary power source, and, in response to the power-fail signal, connecting the interface microprocessor to the second latching relay switch in such a manner that the interface microprocessor opens the second latching relay switch to disable any closing of the input signal circuit by the solid state switch.

* * * * *